Aug. 9, 1938.　　　　G. W. TODD　　　　2,126,357
TRACTOR HITCH
Filed May 11, 1937　　　2 Sheets-Sheet 1

Inventor
Garry W. Todd
By C. A. Snow & Co.
Attorneys.

Aug. 9, 1938.　　　G. W. TODD　　　2,126,357
TRACTOR HITCH
Filed May 11, 1937　　　2 Sheets-Sheet 2
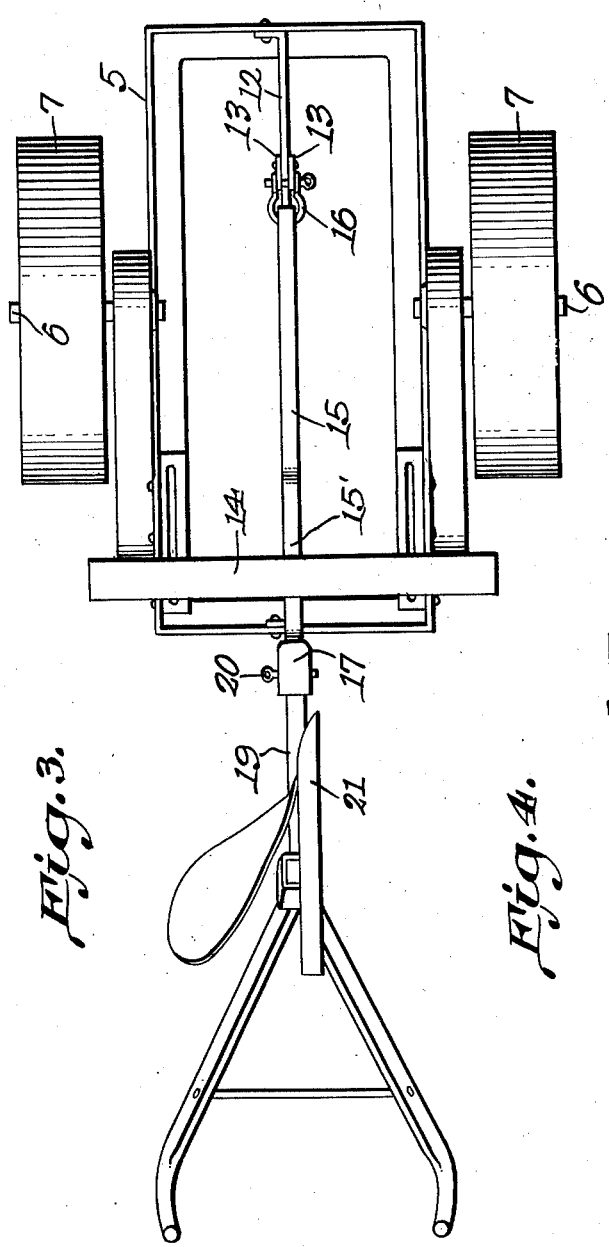
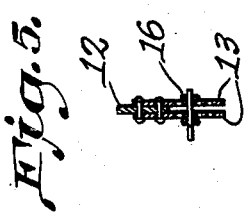
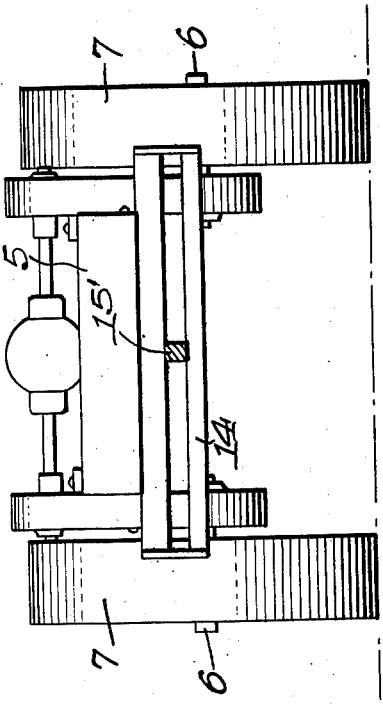
Inventor
Garry W. Todd
By C. A. Snow & Co.
Attorneys.

Patented Aug. 9, 1938

2,126,357

UNITED STATES PATENT OFFICE 2,126,357

TRACTOR HITCH

Garry W. Todd, Charlotte, N. C.

Application May 11, 1937, Serial No. 142,042

2 Claims. (Cl. 280—33.44)

This invention relates to tractors, the primary object of the invention being to provide means for hitching the load to a tractor in such a way that the weight of the drawn load is added to the dead weight of the tractor steadying the tractor with the result that an exceptionally light tractor may be employed for pulling heavy loads or employed in pulling a plow wherein obstructions are encountered by the plow to retard the movement of the plow and tractor, and which ordinarily causes the tractor to swing upwardly on its axle.

Another object of the invention is to provide a tractor of the two wheel or sulky type, having a hitch or draw bar so constructed that the vertical movement of the tractor will operate to raise or lower the plow, hitched thereto, maintaining the plow at a predetermined working depth at all times.

With the foregoing and other objects in view which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 3 is a bottom plan view through the tractor and hitch.

Figure 4 is a transverse sectional view through the draw bar or tractor hitch taken at a point beyond the draw bar guide.

Figure 5 is a sectional view taken on line 5—5 of Figure 1.

Figure 1:
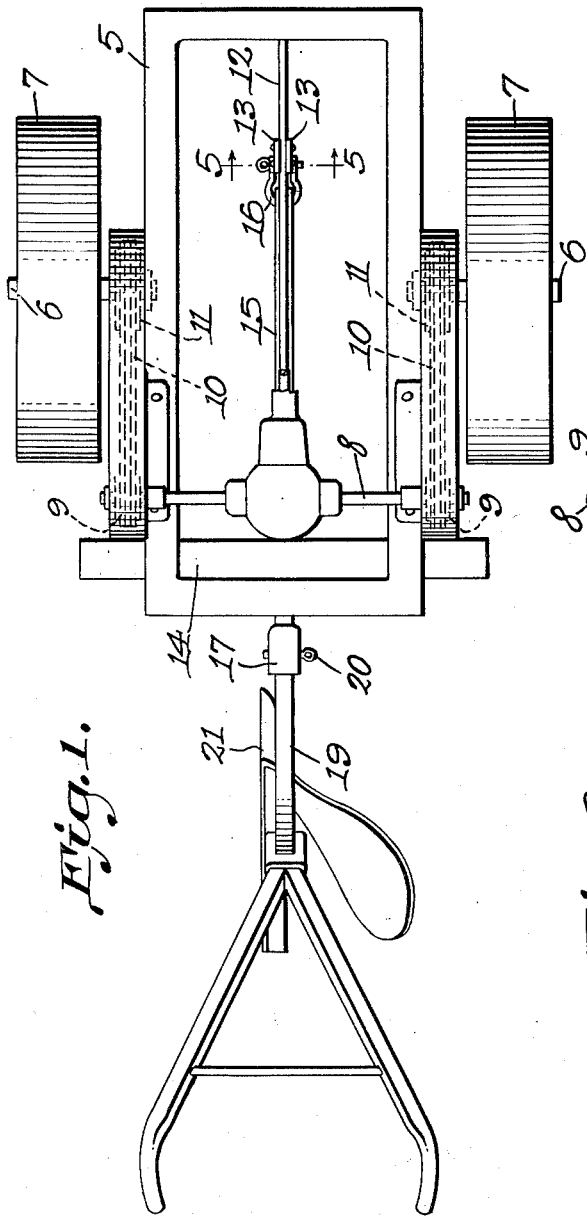
Figure 1 is a plan view of a tractor equipped with a tractor hitch constructed in accordance with the invention.

Referring to the drawings in detail, the tractor frame is indicated generally by the reference character 5, to which the axles 6 of the tractor are secured, the axles supporting the wheels 7 of the tractor.

The wheels 7 are operated by a suitable motor carried on the frame of the tractor, and which has been omitted in the present showing as the motor structure plays no part in the present invention.

The power shaft is indicated by the reference character 8 and carries sprockets 9 at its ends, the sprockets 9 transmitting motion to the wheels 7 through the medium of the chains 10 which also operate over the sprockets 11 secured on the inner ends of the hubs of the wheels 7.

The tractor frame includes a bar 12 that extends longitudinally through the center thereof, to which bar a plate 13 is secured, the plate 13 being provided with a plurality of vertically spaced openings. It might be further stated that this plate 13 is bolted to the bar 12 at a point near the front end of the bar 12 and at a point in advance of the axles 6 for purposes to be hereinafter more fully described.

Adjustable longitudinally of the lower surface of the tractor frame 5, and disposed transversely thereof, is a guide member 14 comprising vertically spaced parallel bars between which the draw bar 15 is mounted. As shown the draw bar 15 has an upwardly curved portion 15' which extends through the guide member 14, to the end that when the guide member is moved longitudinally of the frame, the rear end of the draw bar 15 will be raised or lowered thereby regulating the depth of operation of the plow. The space between the parallel bars of the guide member 14 is such that the draw bar 15 may move transversely within the guide member 14, the rear end of the draw bar extending beyond the rear end of the tractor frame.

Figure 2:
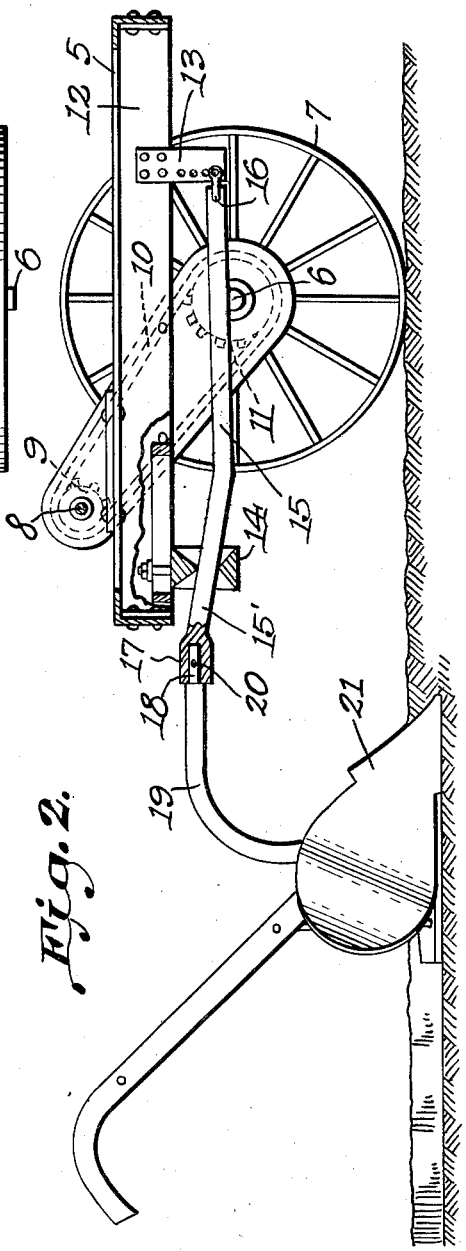
Figure 2 is a longitudinal sectional view through the tractor.

At the forward end of the draw bar 15 is a clevis 16 having a bolt adapted to be extended through an opening of the plate 13 adjustably securing the forward end of the draw bar 15 to the plate. As clearly shown by Figure 2 of the drawings, this draw bar 15 is disposed above the axles 6 of the tractor.

A socket 17 is formed in the rear end of the draw bar 15, the socket being substantially square to receive the square end 18 of the plow beam 19, rigidly connecting the plow beam to the draw bar.

The pin 20 extends transversely through the socket member and through an opening in the end 18 of the plow beam securing the plow beam to the draw bar.

From the foregoing it will be seen that the tractor frame is free to swing vertically on its axles, with the result that should the plow, which is indicated by the reference character 21, meet with an obstruction which would tend to run the plow out of the ground, the front end of the tractor would be moved upwardly with the result that the upper bar of the guide member 14 will move downwardly forcing the plow into the ground surface.

It is further pointed out that because the connection between the draw bar 15 and tractor is made at a point spaced from the forward end of the frame and slightly in advance of the axles 6, the wheels 7 will be held into close engagement with the ground surface when the plow drawn by the tractor, meets with an obstruction eliminating any possibility of the tractor frame tilting forwardly lifting the wheels from the ground surface.

It will also be seen that when a tractor is hitched to its load, in a manner as disclosed, the greater part of the weight of the drawn load is added to the dead weight of the tractor, increasing traction and at the same time making it possible to use an exceptionally light weight tractor for heavy work.

Having thus described the invention, what is claimed is:

1. The combination with a tractor of the sulky type, of a hitching device comprising a draw bar, means for pivotally connecting the draw bar to the tractor frame at a point substantially one-half of the distance between the front end of the tractor frame and axles of the tractor, and means for restricting vertical movement of the rear end of the draw bar.

2. The combination with a tractor of the sulky type, of a hitching device comprising a draw bar, means for pivotally connecting the forward end of the draw bar to the tractor at a point substantially one-half of the distance between the front end of the tractor frame and axles of the tractor, and spaced horizontal guide bars between which the draw bar is mounted, whereby vertical movement of the rear end of the draw bar is restricted.

GARRY W. TODD.